FRANK M. HERR
INVENTOR

BY R. E. Geangue
ATTORNEY

FRANK M HERR
INVENTOR.

BY R.E. Granger
ATTORNEY

United States Patent Office 3,717,163
Patented Feb. 20, 1973

3,717,163
PRECOMPRESSION SHROUD FOR INLETS
Frank M. Herr, Chatsworth, Calif., assignor to CCI
Aerospace Corporation, Van Nuys, Calif.
Filed Oct. 8, 1970, Ser. No. 79,141
Int. Cl. F02k *11/00*
U.S. Cl. 137—15.1                     3 Claims

ABSTRACT OF THE DISCLOSURE

In combination with an air inlet for an air breathing engine, a shroud located ahead of the inlet cowl to effect precompression of the air prior to entrance into the inlet, the shroud having a break in the shroud wall structure, the break being located substantially opposite the surface of the shroud upon which compression of the air occurs.

BACKGROUND OF THE INVENTION

It is well known in the field of air breathing engines, such as jet engines, that if the air is compressed prior to entrance into the combustion chamber of the engine, greater engine efficiency is achieved. In other words, the denser the air entering the combustion chamber, the greater the amount of oxygen made available to effect combustion.

Within the turbo-jet type of engine, a turbine blade compressor structure is employed to compress the air which has entered through the inlet prior to entrance within the combustion chamber. Within the turbo-jet type of engine, a significant portion of the work output of the engine is required to effect operation of this compressor structure. Although the overall engine efficiency is increased by using such a compressor structure, if such a compression of the air could be effected without the employment of a compressor, a significant increase in the overall engine efficiency could be achieved.

In another type of jet engine, the ramjet, no air compressor structure is employed. The ramjet is designed so that the inlet is directly in the path of the air flow and as the velocity of the vehicle is increased, a natural compression of the air occurs within the inlet. Normally, inlets for such ramjet engines have a substantial area to permit entry within the inlet of a sufficient volume of air to effect efficient operation of the engine. Therefore, the precompression of the inlet air within a ramjet engine depends directly upon two factors, the first being the velocity of the engine and second the denseness of the air. It is to be noted that because of the denser atmosphere at lower altitudes, inherently greater engine efficiency is possible at lower altitude. However, because of the denser atmosphere, the greater the aerodynamic drag which prohibits higher velocities due to the heat energy created between the atmosphere and the vehicle. Heretofore, although multiple Mach number velocities could be achieved at higher altitude, the atmosphere is so thin as to not be able to provide sufficient air to operate the engine efficiently.

In an effort to increase the operating efficiency of ramjet engines at higher altitudes, it has been common to employ the use of variable geometry inlet designs. Basically such designs provide for the increasing of the area of the engine air inlet at higher altitudes so as to supply additional volume of air into the engine at a higher altitude. However, one disadvantage of such variable geometry inlet designs has been as the angle of attack increases, the volume of air entering the inlet decreases. Also, such designs are additionally hampered by the use of a high weight penalty for the additional performance gained.

SUMMARY OF THE INVENTION

The precompression shroud of this invention includes the use of a flat plate secured to and ahead of the conventional air inlet cowl. The flat plate is to be positioned so that as the angle of attack of the vehicle increases, the more perpendicular the air flow tends to become when in contact with the plate. The plate is also positioned to be aligned along the wind axis of the inlet at zero angle of attack. Side plates are to be located with respect to the flat plate to contain the compressed air and to avoid lateral expansion. The side plates may be of a basically flat configuration or may be slightly bowed toward each other. It is important that the bottom of the shroud, in other words the surface opposite the flat plate, be opened the entire distance to the inlet cowl. Although it is preferred that the flat plate be of a planar configuration, it may be desirable with some inlet designs to employ the use of a nonplanar configuration. It is only necessary that the flat plate function as a pressure field generator for the mass of air before ingestion into the basic inlet.

The primary feature of the shroud of this invention is to employ a fixed geometry shroud which extends the operating Mach number range significantly above the maximum designed Mach number for an engine and its conventional inlet.

Another feature of the shroud of this invention is to provide for increased mass flow of air at increased angles of attack.

Another feature of the shroud of this invention is to cause the engine to achieve performance capabilities which were previously only possible by means of substantially heavier variable geometry systems.

Many additional features of the shroud of this invention will undoubtably become apparent as the description of this invention proceeds.

DETAILED DESCRIPTION OF THE SHOWN EMBODIMENT

Figure 1:
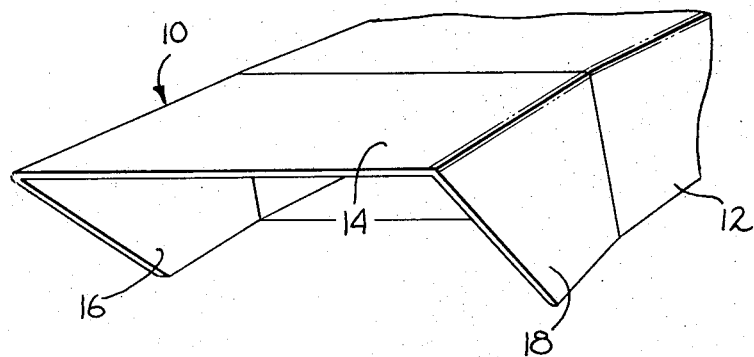
FIG. 1 is a perspective view of the flat sided precompression shroud employed within this invention as it would be secured to a conventional air inlet of an air breathing engine.

Referring particularly to the drawings, there is shown in FIG. 1 embodiment of a precompression shroud 10 of this invention which is secured forward of a conventional inlet 12 of an air breathing engine (not shown). The normal type of air breathing engine which would employ the use of the shroud 10 would be what is termed a ramjet engine. However, it is desired that applicant not be limited to this specific type of engine as the shroud 10 could be readily employed with other types of engines. The inlet 12 is shown to be substantially rectangular shaped and what is commonly referred to as two dimensional inlet. Although the shroud 10 of this invention has been found to be readily employed in combination with such an inlet, it is to be understood that the inlet 12 may assume other configurations such as circular and ellipsoidal. Shroud 10 has an upper flat plate 14 and sides 16 and 18 which are secured to the respective lateral edges of the plate 14. The sides 16 and 18 are also substantially planar in configuration. The material of construction of the sides 16 and 18 and plate 14 is to comprise a rigid sheet material such as steel or the like. It is to be noted that there is no bottom portion of the shroud which would be located opposite the plate 14. It is necessary for the shroud of this invention to not have a bottom surface. The shroud 10 is mounted upon the inlet so that, as the vehicle moves through the air and upon increasing the angle of attack of the vehicle, the air flow will be caused to more directly contact the interior surface of the plate 14. It is to be understood that the shroud 10 is to be fixedly secured with respect to the inlet 12 by means of conventional fastening means (not shown).

Figure 2:
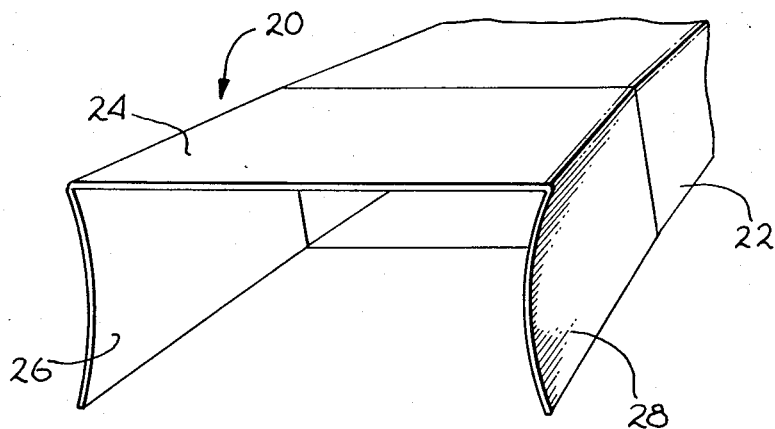
FIG. 2 is a perspective view similar to FIG. 1 of a modified form of shroud wherein the sides of the shroud are convexly curved with respect to each other.

Referring particularly to FIG. 2 of the drawings, there is shown a shroud 20 which is fixedly secured forward of an inlet 22. Inlet 22 is basically identical to inlet 12, and shroud 20 is substantially identical to shroud 10 in that an upper flat plate 24 is employed and sides 26 and 28 are employed. However, the distinction between shroud 20 and shroud 10 is that sides 26 and 28 are slightly bowed to assume a convex configuration with respect to each other. It has been found by applicant that the shroud 20 gives increased performance characteristics as compared to shroud 10. The amount of curvature of the sides 26 and 28 is to be determined by experimentation depending upon the particular installation. As a result, the amount of curvature of sides 26 and 28 is to be considered a matter of choice or design.

Both the shrouds 10 and 20 will operate in the same manner. It is to be understood that upon application to a ramjet engine (which is envisioned by applicant), the shroud 20 will normally give increased performance characteristics as to shroud 10. In the following description of the performance characteristics of the shroud, the characteristics will be based upon shroud 20. It is to be understood that similar characteristics will result from shroud 10. Basically, in the operation of the shroud 10 or 20, the flat plates 14 and 24 are to be located parallel to the wind axis at zero angle of attack. At zero angle of attack the inlet performance is unaffected. As the angle of attack increases the air flow is caused to come into contact with the interior surface of the flat plate 24 or 14. As a result, a "build up" occurs of the air against the surface of the plate which is really compacting of the air into a denser medium. It is to be the function of the side plates to contain the compressed air within this denser medium to avoid lateral expansion. This denser medium is then to be conducted to within the inlet thereby causing an increased mass flow rate within the inlet. Because of the increased mass of air to be located within the inlet, more oxygen is being supplied to the engine which permits the engine to operate with greater efficiency. Actually, as a result of the employment of the precompression shroud of this invention, the engine can operate at a substantially greater altitude than heretofore possible.

Figure 3:
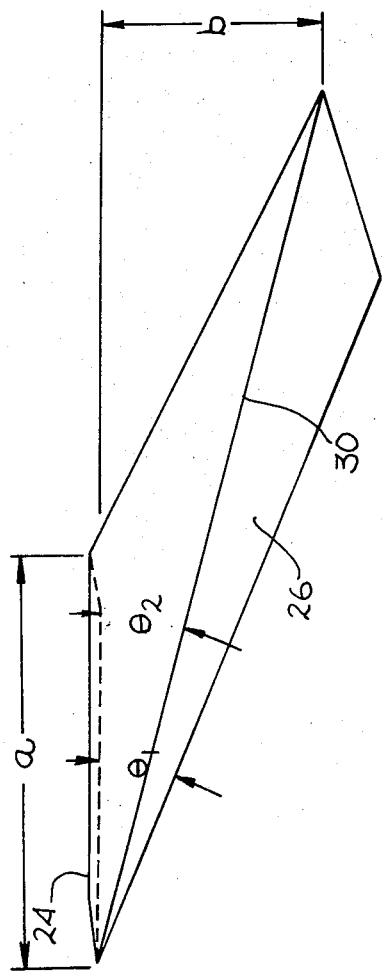
FIG. 3 is a diagrammatic representation of the shroud depicting the predetermined physical dimensions thereof.

In determining the physical dimensions of the precompression shroud 20 or 10, reference may be had in particular to FIG. 3 of the drawings. Dimension $b$ is the depth of the particular conventional inlet 12 or 22 upon which the shroud 20 or 10 is to be installed. It is well known that upon air coming into contact with respect to a fixed surface at a high velocity a shock wave is created. It is known that the shock wave that is created is substantially planar in configuration. A line 30 in FIG. 3 of the drawings is to depict such a shock wave. Line 30 is located between the forwardmost edge of the flat plate 24 and the lower edge of the entrance to the inlet. It is to be noted that the lower aft portion of each of the sides 26 and 28 coincide with the lower edge of the inlet.

Each inlet is basically designed to operate within a certain Mach number range. The line 30 is located so that the angle $\theta_2$ between line 30 and flat plate 24 (in view of dimensions $a$ and $b$) represents the shock wave formed at the maximum operating Mach number and angle of attack of the intended inlet design. The trailing edge of the dimension $a$ is at or behind the vertical plane of the upper cowl leading edge of the conventional inlet. The angle $\theta_1$ is determined between the forwardmost edge of each of the sides 26 and 28 and the interior surface of the flat plate 24. The angle $\theta_1$ is measured for the minimum operating Mach number where maximum flow capture is desired to be conducted within the inlet.

Figure 4:
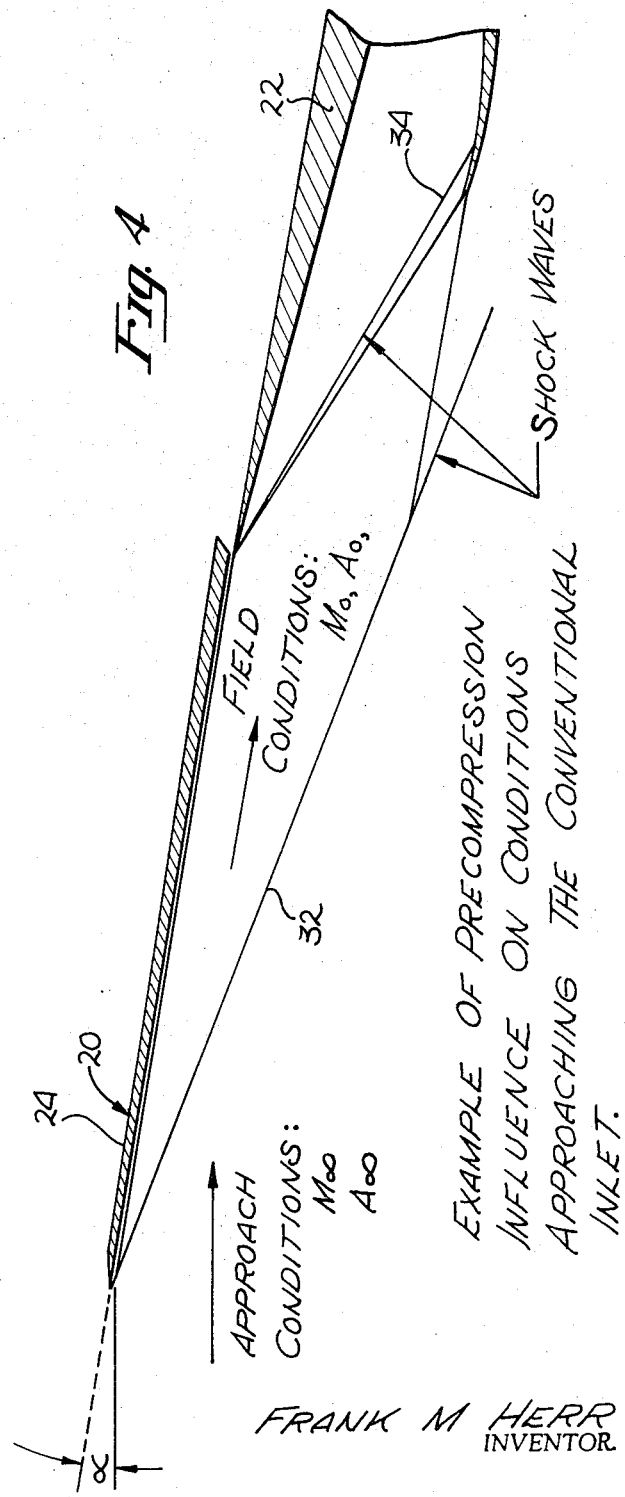
FIG. 4 is a diagrammatic representation of the shroud of this invention showing the effect of the shroud with respect to the conventional inlet with the shroud being subjected at different angles of attack with respect to the air flow.

In referring to specific values of influence of the precompression shroud of this invention as it would be installed upon a conventional inlet, reference may be had in particular to the following table and FIG. 4 of the drawings.

| Approach Mach No., $M_\infty$ | Field Mach No., $M_0$ | Angle of attack, $\alpha$ | Field compression, $A_\infty/A_0$ | Inlet capture, $A_0/A_c$ | Overall capture, $A_\infty/A_c$ |
|---|---|---|---|---|---|
| 4.0 | 4.0 | 0° | 1.0 | 1.0 | 1.0 |
| 4.0 | 3.64 | 5° | 1.375 | 1.0 | 1.375 |
| 4.0 | 3.28 | 10° | 1.79 | 1.0 | 1.79 |
| 4.0 | 2.93 | 15° | 2.18 | 1.0 | 2.18 |
| 4.0 | 2.57 | 20° | 2.48 | .86 | 2.13 |
| 4.0 | 2.21 | 25° | 2.675 | .725 | 1.94 |
| 3.0 | 3.0 | 0° | 1.0 | 1.0 | 1.0 |
| 3.0 | 2.75 | 5° | 1.263 | .945 | 1.195 |
| 3.0 | 2.505 | 10° | 1.533 | .845 | 1.297 |
| 3.0 | 2.255 | 15° | 1.800 | .740 | 1.332 |
| 3.0 | 1.99 | 20° | 2.000 | .635 | 1.270 |
| 3.0 | 1.715 | 25° | 2.130 | .528 | 1.121 |

It will be presumed that the inlet used within this example has a designed Mach number of 2.88. In other words, the mass flow rate capture of the inlet equals 1.0 at 2.88 and above. The approach conditions prior to association with the shroud 20 will be designated with the symbol "infinity," the field conditions which are within the confines of the shroud 20 will be designated with the symbol "zero," and the conditions within the inlet will be designated with the symbol $c$.

It is to be noted that within FIG. 4 of the drawings, the sides 26 and 28 of the shroud 20 are omitted for clarity. The angle of attack is represented by the symbol $\alpha$ and is the angle of the inclination of the plate 24 with respect to the air flow. In referring to the previous table, typical shroud and inlet characteristics are given for Mach number values of the air flow of 3.0 and 4.0. It is to be noted that at both the Mach numbers of 3.0 and 4.0 when the angle of attack is zero degrees, there is no effect created by the shroud upon the air flow within the inlet. However, as the angle of attack increases, at five degrees, the field Mach number decreases to 3.64 as compared to an approach Mach number of 4.0. As a result, the mass flow rate within the field or shroud has increased thirty-seven and one-half percent to 1.375. This increased mass flow rate is conducted to within the inlet. It is to be noted that at fifteen degrees angle of attack, the field Mach number is 2.93. The field compression is 2.18 which is one hundred and eighteen percent greater in mass than the approach mass (the mass at zero degrees angle of attack). This additional mass flow rate is again conducted within the inlet. However, it is to be noted that at twenty degrees angle of attack the increase in denseness within the shroud is 2.48 or almost one hundred and fifty percent greater than at zero degree of attack. However, not all of this mass is transferred within the inlet as the overall capture is only 2.13 which is less than at fifteen degrees angle of attack. It is to be remembered that the particular inlet is designed for a Mach number of 2.88. At 2.88 the line 34, which represents the conventional inlet shock wave, passes through the lower edge of the inle. This would represent the maximum mass flow capture of the inlet. Upon the field Mach number decreasing below 2.88 (as would occur when the angle of attack increased from fifteen degrees to twenty degrees), the greater mass accumulated within the shroud is not all conducted to within the inlet but a portion of it is allowed to be passed exteriorly of the inlet between the lower edge of the inlet and the shock wave represented by line 34. Actually, fourteen percent of the mass flow rate is lost between the shroud and the inlet at twenty degrees of attack (refer to the value of the inlet capture). As the angle of attack continues to increase, the mass flow conducted between the shroud and the inlet continues to decrease although the mass compressed within the shroud increases.

It is to be noted by again referring to the previous table, that with the approach Mach number of 3.00, it is only at zero degree angle of attack that one hundred percent of the mass flow is conducted from the shroud to the inlet. It is to be remembered that this occurs only for this particular example and which the inlet has been designed for a Mach number of 2.88. At five degrees angle of attack the Mach number of the field has dropped below 2.88 and is at a value of 2.75. As a result, only ninety-four and one-half percent of the mass contained within the shroud is being conducted with the inlet. However, the amount of mass which has actually been conducted to within the inlet has increased nineteen and one-half percent from the zero degree angle of attack. Such a relationship continues until at fifteen degrees angle of attack 33.2 percent greater mass flow is conducted to within the inlet than would be possible without the employment of the shroud. At twenty and twenty-five degrees angle of attack, the mass flow rate conducted within the inlet, though less than the 33.2 percent, is still greater than the mass flow rate at zero degree angle of attack.

It is to be understood that numerous modifications may be employed with respect to the precompression shroud of this invention. For example, it is envisoned by applicant that it probably would be desired to employ the use of a boundary layer bleed slots installed between the inlet and the precompression shroud to eliminate boundary layer ingestion into the main inlet.

What is claimed is:

1. In combination with an aircraft, said aircraft including an air breathing engine, said air breathing engine having a supersonic air intake, a shroud fixedly positioned forward of said air intake to effect precompression of the air prior to entrance into said air intake, said shroud comprising:

a flat plate alignably positioned along the wind axis of said air intake at zero angle of attack of said aircraft, said flat plate being further positioned so as the angle of attack increases of said aircraft the more perpendicular the air flow becomes with respect to said flat plate, the length of said plate being such as to connect the shock wave commencing at the forward lip of said plate at approximately the entrance of said inlet under maximum design operating Mach number and angle of attack of said aircraft, a side plate connected to each lateral edge of said flat plate, each of said side plates extending from said inlet and transversely from said flat plate and having a free edge portion shaped to correspond approximately with the shape of the shock wave commencing at said lip under minimum design operating Mach number and maximum angle of attack of said aircraft.

2. The combination of claim 1 wherein:

said supersonic inlet comprises a two dimensional inlet having a forward leading edge on one side and an aft leading edge on the opposite side, each of said edges being substantially transverse of the axis of said inlet, said flat plate being positioned forwardly of said forward leading edge, said free edge portion of each of said side plates comprising first and second edges connected together to form an angle therebetween, said edge terminating at said forward lip and said second edge terminating at said aft leading edge.

3. The combination of claim 1 wherein:

each of said side plates extends substantially perpendicularly from said flat plate.

References Cited

UNITED STATES PATENTS

| | | | |
|---|---|---|---|
| 3,589,379 | 6/1971 | Daues | 137—15.1 |
| 3,439,692 | 4/1969 | Pike | 137—15.2 |
| 3,545,464 | 12/1970 | Brown | 137—15.1 |
| 3,302,657 | 2/1967 | Bullock | 137—15.2 |

ALAN COHAN, Primary Examiner